United States Patent [19]
Krempff

[11] 3,951,675
[45] Apr. 20, 1976

[54] METHOD FOR THE TREATMENT OF PHOSPHOGYPSUM
[75] Inventor: Robert Krempff, Neuilly-sur-Seine, France
[73] Assignee: Centre d'Etudes et de Recherches des Phosphates Mineraux Cerphos, Paris, France
[22] Filed: Sept. 25, 1973
[21] Appl. No.: 400,617

[30] Foreign Application Priority Data
Oct. 2, 1972 France.............................. 72.34872

[52] U.S. Cl................................ 106/109; 423/166; 423/167; 423/555
[51] Int. Cl.$^2$......................................... C04B 11/00
[58] Field of Search ............ 106/109, 110; 423/166, 423/167, 555

[56] References Cited
UNITED STATES PATENTS
2,340,613  2/1944  Perkins................................ 209/166
2,606,127  8/1952  Weber................................. 106/109
3,326,633  6/1967  Carothers et al................... 106/109

OTHER PUBLICATIONS
*Flotation*, A. M. Gaudin, 2nd Edition, 1957, p. 522, McGraw Hill Book Co. Inc.

*Primary Examiner*—Winston A. Douglas
*Assistant Examiner*—John P. Sheehan
*Attorney, Agent, or Firm*—Wenderoth, Lind & Ponack

[57] ABSTRACT

The purification of the raw phosphogypsum issued from the fabrication of phosphoric acid by reaction between phosphate rock and sulphuric acid consists of removing the extreme grain size fractions therefrom.

This method has been developed after it has been found that a large part of the undesirable impurities are concentrated in the extreme grain fractions which constitute only a small percentage of the phosphogypsum. The impurities thus removed are $P_2O_5$, F, $SiO_2$, C, $F_2O_3$ and $Al_2O_3$.

Purification efficiencies can be obtained of the order of 70 % for the total $P_2O_5$ and fluorine, 60 % for silica, and 80 % for organic carbon, while water-soluble $P_2O_5$ is substantially completely removed.

9 Claims, No Drawings

METHOD FOR THE TREATMENT OF PHOSPHOGYPSUM

BACKGROUND OF THE INVENTION

The use of phosphogypsum (i.e. gypsum obtained from the production of phosphoric acid from calcium phosphate and sulphuric acid) as a raw material for the purpose of manufacturing plaster has been the subject of numerous investigations. The installation of phosphoric acid factories in countries which do not have natural gypsum available, the progressive exhaustion of gypsum quarries and the fight against pollution of water courses has lent renewed interest to these investigations.

It has long been known that phosphogypsum cannot be used in its raw state and that it must first be subjected to a purification process for the purpose of removing those elements which interfere with its setting or adversely affect the properties of the plaster obtained. Such a purification process generally consists of a neutralisation of the free acid impregnating the gypsum and of treatment by hydrocyclone, flotation, autoclave baking or double calcination.

BRIEF SUMMARY OF THE INVENTION

It has been found that a large part of the undesirable impurities are concentrated in the extreme grain fractions, which constitute only a small percentage of the phosphogypsum.

The impurities which must generally be taken into account in addition to $P_2O_5$ are fluorine, present especially in the form of fluosilicates, carbon present in the form of organic products in the starting phosphate and silicon present predominantly in the form of silicates, fluosilicates and quartz. Other impurities are iron or aluminium.

The present invention relates to a particularly economic purification treatment, which enables neutralisation to be dispensed with and the consumption of reagent to be reduced to a very small amount by value, and which permits recycling into the phosphoric acid manufacturing process of the unreacted $P_2O_5$ and of the phosphates which are soluble in the water entrained by the phosphogypsum.

According to one aspect of the invention, there is provided a method for the purification of phosphogypsum, which comprises removing the extreme grain size fractions therefrom.

The granulometric limits of the purified gypsum are preferably so selected that the proportions of $P_2O_5$, fluorine and carbon-containing compounds therein, do not exceed respectively 0.01, 0.9 and 0.1 % by weight, the carbon-containing compounds being estimated as carbon.

According to one embodiment of the invention, the upper particle size fraction is eliminated by sieving a gypsum pulp obtained from approximately equal quantities of gypsum and water.

The fraction removed by sieving may be recycled into the phosphoric acid manufacturing process at the phosphate crushing stage.

The lower particle size fraction may be removed by flotation in an installation currently in use in flotation processes, by bubbling air into a pulp formed by phosphogypsum in water, and the purified gypsum may then be dried by the application of pressure.

A small quantity of $CaCO_3$ may be added to the gypsum in order to reduce the acidity where necessary.

The purified gypsum may be baked to obtain plaster and the plaster obtained after baking the purified phosphogypsum is preferably crushed so that approximately 40 % of the particles have a diameter less than 10 $\mu$ and approximately 20 % have a diameter greater than 40 $\mu$.

DETAILED DESCRIPTION OF PREFERRED EMBODIMENTS

In order to illustrate the phenomenon of distribution of the impurities as a function of the grain size, Table 1 shows the percentages of the total insoluble phosphate and of the elements listed above, calculated in the form of : $P_2O_5$, F, $SiO_2$, C, $Fe_2O_3$ and $Al_2O_3$ divided into four granulometric ranges for two batches of phosphogypsum 1 and 2.

A clear increase can be observed in the various percentages above 168 $\mu$ and below 25 $\mu$ for the two batches analysed.

By taking account of the granulometric distribution, it can be calculated that, by removing the extreme fractions, purification efficiencies can be obtained of the order of 70 % for the total $P_2O_5$ and fluorine, 60 % for silica and 80 % for organic carbon. With regard to water-soluble $P_2O_5$, this is substantially completely removed.

It is evident that the granulometric limits of 168 $\mu$ and 25 $\mu$ shown in the Table are suitable for the products analysed, but are not limits which can be applied to all other cases.

The crystallisation of the gypsum depends upon the operating conditions and in practice it is advisable to analyse one or more samples of the gypsum formed under given conditions and to determine the limits of the fractions to be removed as a function of the results obtained. In general, the criteria will be fixed on the basis of the water-soluble $P_2O_5$, fluorine and carbon, which are the most harmful elements, and it has been found that good results are obtained if the removal limits are set such that the $P_2O_5$, fluorine and carbon do not exceed respectively 0.01 %, 0.9 % and 0.1 %.

Nevertheless, these fraction removal limits can be altered to different values depending upon requirements.

TABLE 1

| | Total insoluble $P_2O_5$ | | F | | $SiO_2$ | | C | | $Fe_2O_3$ | | $Al_2O_3$ | |
|---|---|---|---|---|---|---|---|---|---|---|---|---|
| | 1 | 2 | 1 | 2 | 1 | 2 | 1 | 2 | 1 | 2 | 1 | 2 |
| > 168 $\mu$ | 11.5 | 11.3 | 7.54 | 6.82 | 6.24 | 8.55 | 0.18 | 0.30 | — | 0.66 | — | 0.80 |
| 40 – 168 $\mu$ | 0.5 | 0.6 | 0.85 | 0.44 | 3.36 | 2.25 | 0.06 | 0.08 | — | 0.27 | — | 0.10 |
| 25 – 40 $\mu$ | 0.8 | 0.5 | 0.26 | 0.41 | 0.16 | 0.90 | 0.03 | 0.06 | — | 0.09 | — | 0.13 |
| < 25 $\mu$ | 0.9 | 0.9 | 1.03 | 1.64 | 0.22 | 0.70 | 0.40 | 0.57 | — | 0.11 | — | 0.41 |

In one embodiment of the invention, for the purpose of separating the upper fraction, a quantity of water approximately equal to the weight of the gypsum to be treated is added to the gypsum coming from the phosphoric acid manufacturing plant. A vibrating sieve having a mesh size corresponding to the upper granulometric limit selected is supplied with the pulp thus obtained. In general, the quantity not passing the sieve is from 4 to 10% of the quantity treated.

In certain cases, depending upon the method of operation in the phosphoric acid manufacturing plant, the oversize quantity not passing the sieve contains an appreciable percentage of untransformed phosphate. In such cases it is advantageous to recycle the fraction rejected by the sieve to the phosphate crushing stage in the phosphoric acid manufacturing process.

The pulp which has passed through the sieve may then be subjected to a skimming treatment for the purpose of removing the lower fraction by foam entrainment. During this treatment, air is bubbled through the pulp. The foam is formed with the aid of either the organic substances already present in the gypsum, or by a wetting agent which has been added in a quantity which may range from 0 to 200 ml per 1000 kg of pulp.

The optimum quantity of wetting agent should be determined experimentally, since it will depend upon the proportion of organic materials already present in the gypsum.

Particularly suitable wetting agents are the alkylarylsulphonates, such as dodecylbenzenesulphonate and tetrapropylbenzene sulphonate.

For a given installation and quantity of wetting agent, the size of the particles taken up in the foam can be determined by the residence time, which is in general from 10 to 30 minutes. After this treatment, the pulp is filtered. Since the starting gypsum still contains water soluble phosphates and phosphoric acid, these are dissolved in the water which has been added, with the result that they are removed by the filtration and will be found in the filtration liquor, which may with advantage be recycled into the acid manufacturing plant at the stage of washing the filtration cake.

It has been proved that the introduction, at the attack vessel of very small quantities of wetting agents of the type indicated does not have any adverse effect upon the performance of the phosphoric acid manufacturing plant.

After filtration, the filter cake is generally washed at least twice.

In order to prevent, during baking of the gypsum for the purpose of converting it into plaster, a small proportion of the syncrystallised $P_2O_5$ still present in the phosphogypsum from becoming released and dissociating into tricalcic phospate and monocalcic phosphate, or possibly into free acid, which acid can cause corrosion of the baking furnace, a small proportion of calcium carbonate may be added during the gypsum purifying process in order to neutralise this acid.

The $CaCO_3$ is generally added in a proportion of from 0.2 to 2%, preferably approximately 1%, calculated in relation to the weight of dry gypsum.

In this manner, very low acidity can be maintained during baking and in the final product. This acidity is conveniently determined with a test paper of pH value in the vapours coming from the gypsum. The value measured should be from 6 to 7. In addition, improved workability of the plaster results.

The $CaCO_3$ is preferably added by one of two different methods. According to the first method, it is added in the form of a suspension in the water serving for the second washing of the filter cake.

According to a second method, the $CaCO_3$ is added in the form of a fine powder at the discharge from the filter or between the operations of drying and baking the gypsum.

In the purification process, approximately 1.6 tons of water are typically used in total for one ton of gypsum to be treated. After filtration, approximately 1.3 tons of water are recovered, which is recycled, corresponding to a flow rate compatible with the quantity of water used for washing the gypsum in the phosphoric acid manufacturing plant.

In the purified gypsum, the range of grain size is very restricted, which distinguishes it from natural gypsum, and possesses advantages from the point of view of later treatment.

After the gypsum has been dried, it may be converted by baking into plaster. It is advantageous to subject the plaster obtained to a crushing treatment in a crusher, for example of the turbine type or spike type, such that approximately 20% of the particles shall have a diameter exceeding $40\mu$ and 40% a diameter less than $10\mu$. This plaster may be mixed using a water/plaster ratio of 0.65, giving improved mechanical properties. These experiments have given the following values:

| | |
|---|---|
| bending strength | 36 kg/cm$^2$ |
| compressive strength | 125 kg/cm$^2$ |

By way of comparison, these same readings can be taken on a plaster, of which 60% of the particles have a diameter exceeding $40\mu$ and which has to be mixed with a water/plaster ratio of 0.9; the results then obtained are:

| | |
|---|---|
| bending strength | 25 kg/cm$^2$ |
| compressive strength | 75 kg/cm$^2$ |

For the purpose of illustrating the invention, a number of detailed examples are given below: these however should not be construed as limiting the invention. Percentages are by weight.

EXAMPLE 1

There are used 100 kg of gypsum produced in the manufacture of phosphoric acid, and containing 24% of free water and the following proportions of impurities after drying at 60°C:

| | |
|---|---|
| Total $P_2O_5$ | 1.4% |
| Syncrystallised $P_2O_5$ | 0.8% |
| Water-soluble $P_2O_5$ | 0.4% |
| $SiO_2$ | 1.4% |
| F | 1.1% |
| C | 0.2% |

The total percentage of $P_2O_5$ expresses the total phosphate content, while syncrystallised $P_2O_5$ expresses the bicalcic phosphate and the water soluble $P_2O_5$ expresses the phosphoric acid and monocalcic phosphate.

To the 100 kg of starting gypsum there are added 100 kg of water, thus giving a pulp containing 38% of solid material, the density being 1310 g/dm$^3$.

This pulp is passed over a vibrating sieve having a mesh size of $168\mu$. The pulp is separated into 20 kg of retained material containing 55% of solid matter, while the 180 kg of pulp passing through the sieve contain 36% of solid material. The proportions of impurities in the dry state in the retained material are as follows:

| | |
|---|---|
| Total $P_2O_5$ | 8.3% |
| Syncrystallised $P_2O_5$ | 0.4% |
| $SiO_2$ | 7.3% |
| F | 8.0% |

36 ml of dodecylbenzene sulphonate are added to the 180 kg of pulp, and the mixture is introduced into a conventional flotation installation.

During the 30 minute skimming period, the scum is continuously separated from the suspension and in this way there are obtained 144 kg of purified pulp containing 40% solid matter, and 36 kg of product entrained by the scum, containing 20% of solid matter.

The analysis of the impurities in the lower fraction, after drying at 60°C, gave the following results:

| | |
|---|---|
| Total $P_2O_5$ | 0.9% |
| Syncrystallised $P_2O_5$ | 0.4% |
| $SiO_2$ | 0.22% |
| F | 1.0 |
| C | 0.4 |

The purified pulp is filtered and is washed with 60 kg of water. After washing, there are obtained 72 kg of gypsum containing 22% of free water, 103 kg of expressed liquor which is recycled into the phosphoric acid manufacturing process, and 27 kg of water which has served for washing the filter cake.

The proportions of impurities in the purified gypsum, dried at 60°C, are as follows:

| | |
|---|---|
| 0.5% | of total $P_2O_5$ |
| 0.4% | of syncrystallised $P_2O_5$ |
| 0.01% | of water-soluble $P_2O_5$ |
| 1.0% | of $SiO_2$ |
| 0.5% | of F |
| 0.05% | of C |

After baking the purified gypsum at 160°C, a plaster is obtained having a purity, calculated on the basis of $SO_3$, of 92.5%.

EXAMPLE 2

100 kg of wetted gypsum containing 24% of free water are treated in an identical manner to that of Example 1.

The gypsum dried at 60°C contains the following proportions of impurities:

| | |
|---|---|
| Total $P_2O_5$ | 1.8% |
| Syncrystallised $P_2O_5$ | 0.6% |
| Water-soluble $P_2O_5$ | 0.3% |
| $SiO_2$ | 1.0% |
| F | 1.5% |
| C | 0.3% |

However, the gypsum contains organic materials, which make the use of a wetting agent unnecessary.

The residence time in the flotation installation is 20 minutes, and during this operation 30% by weight of the gypsum is removed.

The composition of the purified gypsum after drying at 60°C is as follows:

| | |
|---|---|
| Total $P_2O_5$ | 0.6% |
| Syncrystallised $P_2O_5$ | 0.4% |
| Water-soluble $P_2O_5$ | 0.01% |
| $SiO_2$ | 0.7% |
| F | 0.3% |
| C | 0.06% |

What we claim is:

1. A method for the treatment of phosphogypsum, which consists essentially of subjecting a pulp, obtained from mixing phosphogypsum and water, to a wet screening step by passing the pulp through a sieve to remove the coarse grain fractions, subjecting the pulp passing through the sieve to a flotation process to remove the fine grain fractions thereof, the granulometric limits of the treated phosphogypsum being so selected that the proportions of water-soluble $P_2O_5$, fluorine and carbon compounds which exist as impurities in the phosphogypsum do not exceed 0.01, 0.9 and 0.1% respectively, the percentage of the carbon containing compounds being calculated on the basis of the carbon content, filtering the thus-purified phosphogypsum to obtain the solid purified phosphogypsum residue; washing the residue with water; drying the residue and baking the thus-obtained phosphogypsum residue to convert it into plaster; said phosphogypsum being treated by adding thereto, prior to the baking step, calcium carbonate to adjust the acidity thereof.

2. A method according to claim 1, wherein the upper grain size fraction of the phosphogypsum is removed by sieving a pulp obtained by mixing approximately equal quantities of phosphogypsum and water.

3. A method according to claim 1, wherein an alkylaryl sulphonate wetting agent is added to the pulp prior to the flotation step for the purpose of improving separation by flotation.

4. A method according to claim 3, wherein the wetting agent is dodecylbenzene sulphonate or tetrapropylbenzenesulphonate.

5. A method according to claim 1, wherein the quantity of $CaCO_3$ is from 0.2 to 2% calculated on the weight of dry phosphogypsum.

6. A method according to claim 1, wherein the quantity of calcium carbonate added is approximately 1% by weight of the dry phosphogypsum.

7. A method according to claim 1, wherein the calcium carbonate is added in the form of a suspension at a filter at which the purified phosphogypsum is separated and washed.

8. A method according to claim 1, wherein the gypsum is discharged from a filter and the calcium carbonate is added in the form of a fine powder.

9. A method according to claim 1 wherein the removed upper grain size is recycled into a phosphoric acid manufacturing process from which the phosphogypsum is obtained at the phosphate crushing stage of said process and wherein the filtrate obtained by the separation of the treated phosphogypsum through filtration is recycled into said phosphoric acid manufacturing process, at the stage of washing the phosphogypsum on a filter during said process.

* * * * *